United States Patent
Jang

(10) Patent No.: US 9,928,020 B2
(45) Date of Patent: Mar. 27, 2018

(54) DISPLAY APPARATUS AND METHOD FOR PERFORMING MULTI-VIEW DISPLAY

(71) Applicant: SAMSUNG ELECTRONICS CO., LTD., Suwon-si, Gyeonggi-do (KR)

(72) Inventor: Sung-chang Jang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/629,993

(22) Filed: Feb. 24, 2015

(65) Prior Publication Data
US 2015/0301777 A1 Oct. 22, 2015

(30) Foreign Application Priority Data
Apr. 22, 2014 (KR) .................. 10-2014-0048120

(51) Int. Cl.
*G06F 3/02* (2006.01)
*G09G 5/00* (2006.01)
(Continued)

(52) U.S. Cl.
CPC ............. *G06F 3/14* (2013.01); *G06F 3/0227* (2013.01); *G06F 3/0416* (2013.01); *H04N 5/4403* (2013.01); *H04N 5/44591* (2013.01); *H04N 21/4126* (2013.01); *H04N 21/42222* (2013.01); *H04N 21/4314* (2013.01); *H04N 21/47* (2013.01); *H04N 21/4782* (2013.01); *H04N 21/482* (2013.01); *H04N 21/485* (2013.01); *H04N 2005/4428* (2013.01)

(58) Field of Classification Search
CPC ........ G06F 3/0227; G06F 3/0416; G06F 3/14; H04N 2005/4428; H04N 21/4126; H04N 21/42222; H04N 21/4314; H04N 21/47; H04N 21/4782; H04N 21/482; H04N 21/485; H04N 5/4403; H04N 5/44591
See application file for complete search history.

(56) References Cited

U.S. PATENT DOCUMENTS 7,149,985 B1    12/2006  Crosby et al.
2009/0231293 A1*  9/2009  Nakayama ......... G01C 21/3611
                                                345/173
(Continued)

FOREIGN PATENT DOCUMENTS

EP          2 613 546 A2    7/2013

OTHER PUBLICATIONS

Partial European Search Report dated Sep. 14, 2015 in corresponding European Patent Application No. 15164719.5.
(Continued)

*Primary Examiner* — Insa Sadio
(74) *Attorney, Agent, or Firm* — Staas & Halsey LLP

(57) ABSTRACT

A display apparatus includes a display configured to display a plurality of images corresponding to a plurality of contents, a controller configured to, in response to a manipulation regarding the display apparatus being detected, control the display to display an object indicating an image for which a manipulation command is to be applied on one of the plurality of images, and an input unit configured to receive an input of a display location of the object on the plurality of images and a manipulation command regarding an image where the object is located.

10 Claims, 13 Drawing Sheets

(51) Int. Cl.
*G06F 3/14* (2006.01)
*G06F 3/041* (2006.01)
*H04N 5/44* (2011.01)
*H04N 5/445* (2011.01)
*H04N 21/41* (2011.01)
*H04N 21/422* (2011.01)
*H04N 21/431* (2011.01)
*H04N 21/47* (2011.01)
*H04N 21/4782* (2011.01)
*H04N 21/482* (2011.01)
*H04N 21/485* (2011.01)

(56) References Cited

U.S. PATENT DOCUMENTS

| | | | |
|---|---|---|---|
| 2011/0093778 A1* | 4/2011 | Kim | G06F 3/041 |
| | | | 715/702 |
| 2013/0141362 A1* | 6/2013 | Asanuma | G06F 3/041 |
| | | | 345/173 |
| 2014/0009394 A1* | 1/2014 | Lee | H04N 5/4403 |
| | | | 345/157 |
| 2014/0055675 A1* | 2/2014 | An | H04N 5/44504 |
| | | | 348/569 |

OTHER PUBLICATIONS

Extended European Search Report dated Jan. 12, 2016 in corresponding European Patent Application No. 15164719.5.

* cited by examiner

DISPLAY APPARATUS AND METHOD FOR PERFORMING MULTI-VIEW DISPLAY

CROSS-REFERENCE TO RELATED APPLICATIONS

This application claims priority from Korean Patent Application No. 10-2014-0048120, filed in the Korean Intellectual Property Office on Apr. 22, 2014, the entire disclosure of which is incorporated herein by reference.

BACKGROUND

1. Field

Aspects of the exemplary embodiments relate to a display apparatus and a method for performing multi-view display thereof, and, more particularly, to a display apparatus which, in response to a plurality of images corresponding to a plurality of contents being displayed, analyzes an image to which a manipulation command is to be applied and selects an image for which the manipulation is to be executed and a method for performing multi-view display thereof.

2. Description of the Related Art

With the development of electronic technology, various types of electronic products have been developed and distributed. In particular, various display apparatuses such as a television (TV), a mobile phone, a PC (personal computer), a notebook PC, and a PDA (personal digital assistant) have been widely used in a house.

As more and more display apparatuses are used, a user's needs for various functions of the apparatuses have also increased. Accordingly, in order to meet the user's needs, manufacturers are coming up with products with new functions.

Recently, a display apparatus providing a multi-view mode has been distributed. The multi-view mode refers to a mode where a plurality of different contents are displayed using one display apparatus, typically, in a split screen type arrangement.

Meanwhile, there may be a case where a user need to manipulate a specific image when a display apparatus operates in a multi-view mode. In the related art, it is difficult to figure out which image is to be manipulated by a user's manipulation command and, thus, a user's manipulation command is applied only to a main image.

Accordingly, it is difficult for a user to manipulate images in the multi-view other than the main image. Specifically, in a related art, a multi-view mode is converted into a single-view mode, and then converted back to a multi-view mode including a user's desired image.

In addition, when a manipulation is performed on a main image, a GUI (graphical user interface) for manipulating the main image is also displayed in other images, blocking the view of the images contents of other users who are not involved with the manipulation preventing them from watching contents.

SUMMARY

An aspect of the exemplary embodiments relates to a display apparatus which in response to a plurality of images corresponding to a plurality of contents being displayed, analyzes an image to which a manipulation command is to be easily applied and an image for which the manipulation is to be executed and a method for performing multi-view display thereof.

A display apparatus according to an exemplary embodiment includes a display configured to display a plurality of images corresponding to a plurality of contents, a controller configured to, in response to a manipulation regarding the display apparatus being detected, control the display to display an object indicating an image for which a manipulation command is to be applied on one of the plurality of images, and an input unit configured to receive an input of a display location of the object on the plurality of images and a manipulation command regarding an image where the object is located.

The indicator object may have one of shapes including a number keypad shape, a qwerty keypad shape, a channel keypad shape, and a remote controller shape.

The input unit may receive an input of a display location of the indicator object and a manipulation command through a touch command on a touch screen.

The input unit may receive a display location of the indicator object and a manipulation command from a mobile apparatus or a remote controller which is connectable to the display apparatus.

The apparatus may further include a content receiver configured to receive a content from each of a plurality of input sources corresponding to the plurality of contents, and a content processor configured to generate a multi-view screen where a plurality of images corresponding to the received plurality of contents are displayed on each of a plurality of split screens as a single screen simultaneously and provide the multi-view screen to the display.

The input sources may be one of television, HDMI (high-definition multimedia interface), USB (universal serial bus), and Internet.

A display apparatus according to an exemplary embodiment includes a display configured to display a plurality of images corresponding to a plurality of contents, a controller configured to, in response to a manipulation regarding the display apparatus being detected, control the display to display number information or other identification information, such as a letter, on each of the plurality of images (or another type of identifier, such as a letter), and an input unit configured to receive an input of a number key corresponding to the displayed number information, and receive an input of a manipulation command regarding an image corresponding to the number key.

The controller, in response to a number key corresponding to the displayed number information being input, may control the display to display an object indicating an image for which a manipulation command is to be applied on a image corresponding to the number key.

The display may display a plurality of images corresponding to each of the plurality of contents on each of a plurality of split screens on one screen simultaneously.

The display may display a plurality of images corresponding to each of the plurality of contents alternately or in time division.

A method of performing a multi-view display of a display apparatus according to an exemplary embodiment includes displaying a plurality of images corresponding to a plurality of contents, in response to a manipulation regarding the display apparatus being detected, displaying an indicator object indicating an image for which a manipulation command is to be applied on one of the plurality of images, and receiving an input of a display location of the object on the plurality of images and a manipulation command regarding an image where the object is located.

The object may have one of a number keypad shape, a qwerty keypad shape, a channel keypad shape, and a remote controller shape.

The receiving an input may include receiving an input of a display location of the object and a manipulation command through a touch command on a touch screen.

The receiving an input may include receiving a display location of the object and a manipulation command from a mobile apparatus or a remote controller which is connectable to the display apparatus.

The method may further include receiving a content from each of a plurality of input sources corresponding to the plurality of contents and generating a multi-view screen where a plurality of images corresponding to the received plurality of contents are displayed on each of a plurality of split screens on one screen simultaneously, and the displaying may include displaying the generated multi-view screen.

The input sources may be one of a television, an HDMI (high-definition multimedia interface) device, USB (universal serial bus) device, and Internet.

A method of performing multi-view display of a display apparatus according to an exemplary embodiment includes displaying a plurality of images corresponding to a plurality of contents, in response to a manipulation regarding the display apparatus being sensed, displaying number information or other indicator information on each of the plurality of images, and receiving an input of a number key or other key corresponding to the displayed number information or other information, and receiving a manipulation command regarding an image corresponding to the number key.

The method may further include, in response to a number key corresponding to the displayed number information being input, displaying an object indicating an image where a manipulation command is to be applied on an image corresponding to the number key.

The displaying may include displaying a plurality of images corresponding to each of the plurality of contents on each of a plurality of split screens as one screen simultaneously.

The displaying may include displaying a plurality of images corresponding to each of the plurality of contents alternately.

An aspect of the exemplary embodiments relates to a display method in which a screen image on a display may include images each having a different content, a display control indicator in one of the images of the screen may indicate which image is being controlled by a control action and a control command by a user indicating the control action may be applied to the one of the images when the user enters the control command. The screen image may be a split screen image of the images and may be a time division display of the images. The display control indicator may be moved to another of the images using a pointer and a drag and drop operation. The control command may be entered via one of a remote control, a keyboard, a button and a touch screen. The control indicator may correspond to a type of the image. In the method, when the type of image is a TV image, the control indicator is a remote control image and a display control may be a remote control, when the type of image is an internet image, the control indicator is a keyboard image and the display control may be a keyboard, when the type of image is an HDMI image, the control indicator is a UI image and the display control may be a UI keypad, and when the type of image is a USB image, the control indicator is a USB image and the display control may be a UI keypad.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

Figure 1:
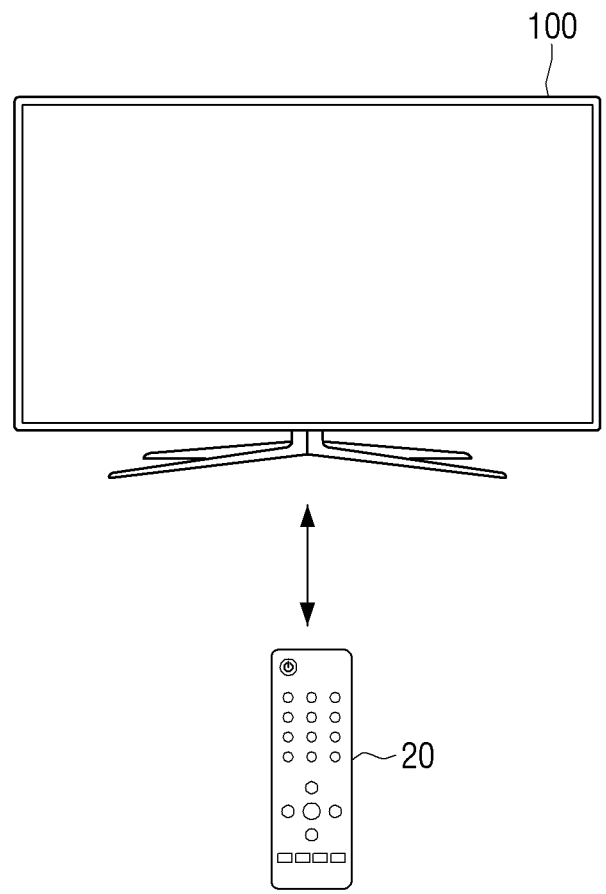
FIG. 1 is a view illustrating a multi-view display system according to an exemplary embodiment.

Hereinafter, an exemplary embodiment will be described in detail with reference to accompanying drawings. In the following description, same reference numerals are used for analogous elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

In the present disclosure, relational terms such as first and second, and the like, may be used to distinguish one entity from another entity, without necessarily implying any actual relationship or order between such entities.

FIG. 1 is a view illustrating a multi-view display system according to an exemplary embodiment.

Referring to FIG. 1, a multi-view system 1000 includes a display apparatus 100 and a remote controller 20.

The display apparatus 100 displays a content. Specifically, the display apparatus 100 displays a content input from an external input source or pre-stored content. Herein, the display apparatus 100 may be various apparatuses having a display unit, such as a television including a processor, a mobile phone, a PDA (personal digital assistant), a notebook PC (personal computer), a monitor, a tablet PC, an electronic book, an electronic album, a kiosk, etc.

In this case, the display apparatus 100 may display a content or a plurality of contents simultaneously. Specifically, the display apparatus 100 according to an exemplary embodiment supports not only a general mode but also a multi-view mode. Herein, the general mode is a mode where one or a single content is displayed, and the multi-view mode is a mode where a plurality of different contents are displayed.

When two contents are displayed, the multi-view mode may be referred to as a duel-view mode, when three contents are displayed, a triple-view mode, when four contents are displayed, a quad-view mode, etc., but in this specification, the term, a multi-view mode, will be used. In terms of the method of displaying a plurality of contents, the multi-view mode may include a first multi-view mode where one screen is divided into a plurality of screens and a plurality of contents are displayed on the each of the divided screens, and a second multi-view mode where a plurality of images are in a time division approach displayed.

Subsequently, the display apparatus 100 receives a manipulation command. Specifically, the display apparatus 100 receives various control commands through a remote controller 20. Meanwhile, in the exemplary embodiment, a user's manipulation command is input through the remote controller 20, however, a user's manipulation command may be input through an input unit mounted on the display apparatus 100 (for example, a button and a touch screen).

Meanwhile, when the display apparatus 100 is in a multi-view mode and a manipulation or control action is sensed on the display apparatus 100, the display apparatus 100 may receive an image where the manipulation command or control command is to be applied from among a plurality of images, and display an object on the image where the manipulation command is to be applied. Herein, the object (an indicator object) is a graphic image indicating an image where a manipulation command or control command is to be applied, and may be the shape of number keypad, qwerty keypad, channel keypad, or remote controller.

The manipulation command may be related to an image manipulation. For example, as a command to convert a multi-view mode to a single-view mode or a power off mode are not commands regarding a specific image, when such a manipulation is input, a selection of an image may not be input. Accordingly, only when a manipulation command regarding an image, such as a channel change, a number key input, a character key input, etc., is input, the above-described object may be displayed.

The display apparatus 100 may receive a manipulation command regarding the image where the object is located through the displayed object, and perform a function corresponding to the input manipulation command.

The remote controller 20 receives a manipulation command regarding the display apparatus 100 from the user, such as by pressing a remote controller button. Subsequently, the remote controller 20 transmits the manipulation command input from a user to the display apparatus 100.

In this case, the remote controller 20 may transmit the manipulation command using a unidirectional or bidirectional wireless communication method. Specifically, the remote controller 20 has a plurality of keys, and a control command corresponding to a key selected by the user may be transmitted to the display apparatus 100. Such a control command may include a command for channel up/down, volume up/down, and a command to change to a channel number, a character key, or to move a cursor (direction key), etc. Herein, the command to move a cursor (or to select a direction key) may be used to receive an input of the image where a manipulation command is to be applied from among the plurality of images mentioned above.

Alternatively, the remote controller 20 may include a location sensor, and transmit coordinates of the display apparatus 100 on the screen corresponding to a three-dimensional location direction of the remote controller 20 to the display apparatus 100. That is, the remote controller 20 may operate in the same way as or like a mouse in a computer.

Meanwhile, if the display apparatus 100 is capable of communicating with the remote controller in a bidirectional manner, the display apparatus 100 may transmit information regarding the image where a manipulation command is to be applied to the remote controller 20, and the remote controller 20 may display information regarding the image subject to the manipulation on the current remote controller 20.

Meanwhile, the remote controller 20 according to an exemplary embodiment may be an apparatus which is used exclusively for a manipulation of the display apparatus 100, or may be smart phone, PDA, tablet PC, etc. which can perform other functions as well.

In the above-described exemplary embodiment, when a user manipulation is sensed while multi-view display is executed, the multi-view display system 100 may inform a user of the image where the user manipulation is to be applied and allow the user to change the image where the user manipulation is to be applied. Accordingly, the user may easily control each of the multi-view images.

Meanwhile, in the above exemplary embodiment, the display apparatus 100 is directly connected to the remote controller 20, but the display apparatus 100 and the remote controller 20 may be connected through a relay apparatus such as a router. In addition, in the corresponding drawing, the display apparatus 100 is connected to one remote controller 20, but the display apparatus 100 may be connected to a plurality of remote controllers, or the remote controller 20 may be connected to a plurality of display apparatuses.

Further, in the above exemplary embodiment, the display apparatus 100 receives a manipulation command through the remote controller 20, but the display apparatus 100 may receive a manipulation command through a touch screen or a button which is provided therein.

Figure 9:
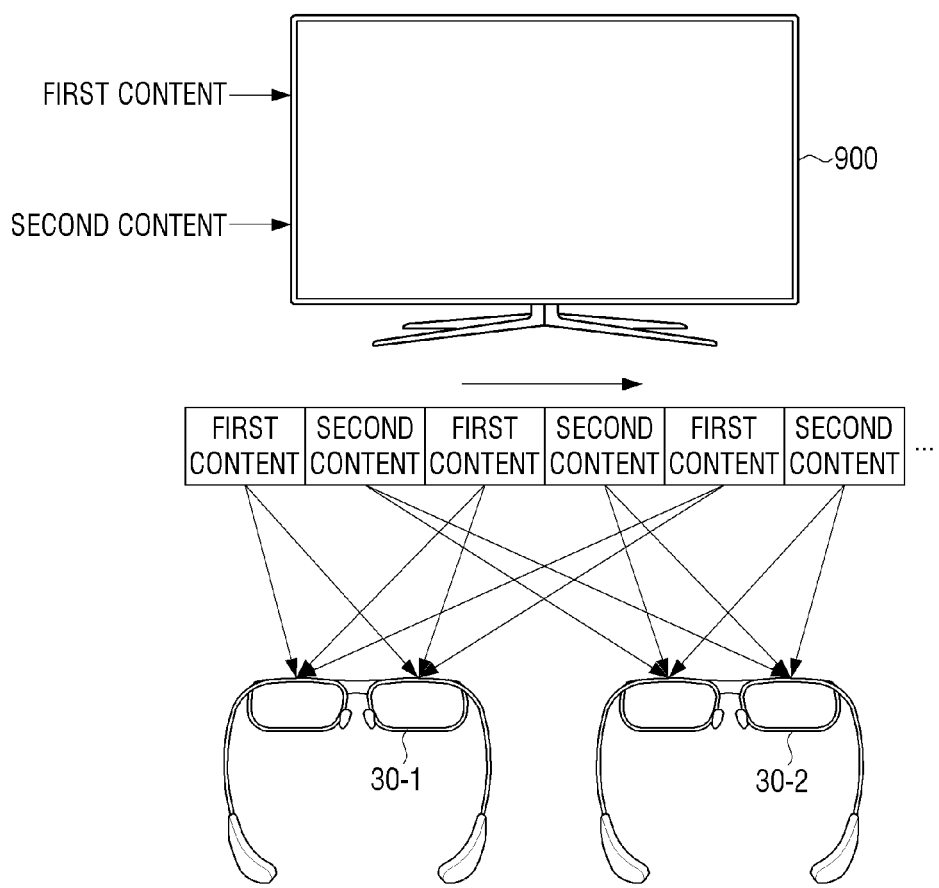
FIGS. 9 to 12 are views illustrating an example screen which may be displayed in a second multi-view mode.

In the above description regarding FIG. 1, the multi-view display system 1000 includes only the display apparatus 100 and the remote controller 20, but the multi-view display system 1000 may further include a plurality of glasses, such as 3D glasses, or a plurality of wireless earphones, etc. to provide different sound for each user as shown in FIG. 9.

Figure 2:
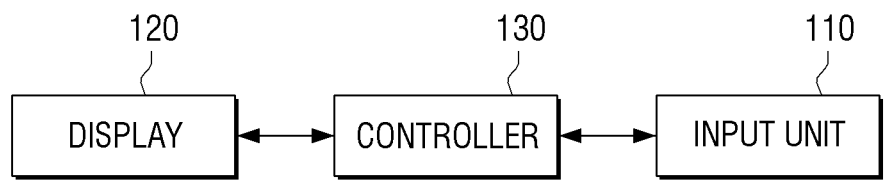
FIG. 2 is a block diagram briefly illustrating configuration of a display apparatus of FIG. 1.

FIG. 2 is a block diagram briefly illustrating a configuration of a display apparatus of FIG. 1 briefly.

Referring to FIG. 2, the display apparatus 100 according to an exemplary embodiment includes an input unit 110, a display 120, and a controller 130, such as a processor.

The input unit 110 receives a manipulation command regarding the display apparatus 100. Specifically, the input unit 110 may receive the display location of an indicator object or a manipulation command through a button or a touch screen which is provided therein, or may receive the display location of an object or a manipulation command from the external remote controller 20 or an electronic apparatus.

The input unit 110 may receive a selection of content to be displayed. For example, if the display apparatus 100 includes a plurality of source inputs, the display 120, which will be described later, may receive a selection of source input regarding a content to be displayed.

The input unit 110 may receive an operation state of a display apparatus. Specifically, the input unit 110 may receive one of a general mode and a multi-view mode. Meanwhile, if a multi-view mode is input, the input unit 110 may receive an input of the number of images to be displayed on the display 120 or a method of displaying a plurality of images. That is, the input unit 110 may receive an input regarding whether a display apparatus operates in the first multi-view mode or in the second multi-view mode previously mentioned.

The input unit 110 receives an input of an image where a manipulation command is to be applied from among a plurality of images. Specifically, when a manipulation regarding the display apparatus 100 is sensed while a display apparatus operates in a multi-view mode, the input unit 110 may receive an input of an image where the manipulation command is to be applied' through a command to move an object displayed on the image, or may receive an image where the manipulation command is to be applied by receiving an input of a number key corresponding to the image. Herein, the manipulation on the display apparatus 100 can be sensed through a touch on a touch screen or an input on the remote controller 20. Meanwhile, the key input on the remote controller 20 may be applied in a distinctive manner. For example, as for a command applying to a plurality of images commonly (for example, power off), the command may be executed immediately without receiving an input of image where the command is to be applied.

In addition, the input unit 110 may receive an input of manipulation command. Specifically, if a manipulation command is input while an indicator object indicating an image for which the manipulation command is to be applied is displayed, the input unit 110 may treat the corresponding manipulation command as a manipulation command to be applied to the image where the object is located. For example, if a channel-up command is input while a channel keypad is displayed on a second image, the input unit may receive the corresponding command as a channel-up command for the second image. Alternatively, if a power-off command is input while a channel keypad is displayed on the second image, the input unit may treat the corresponding command as a command to convert the current mode to a multi-view mode where the second image is excluded (for example, when more than three images are displayed simultaneously) or a command to convert the current mode to a general mode (for example, when more than two images are displayed simultaneously).

The term 'input unit' can be used interchangeably with 'receiving unit'.

The display 120 displays a content. Specifically, if the display apparatus 100 operates in a general mode, the display 120 displays one or a single content received through a content receiver 140 which will be described later. In this case, the one or single content may be a multi-media signal of which video or audio is processed by a content processor 150.

Meanwhile, if the display apparatus 100 operates in a multi-view mode, the display 120 may display a plurality of contents received through the content receiver 140 which will be described later. In this case, the plurality of contents received through the content receiver 140 may each be a multi-media signal regarding the plurality of contents processed by the content processor 150.

If the display apparatus 100 operates in a multi-view mode and a manipulation of the display apparatus is sensed, the display 120 may display information for receiving an input of an image for which the manipulation is to be applied from among a plurality of images. Specifically, the display 120 may display an object (an indicator object) on one of a plurality of images on one side of the corresponding image. In this case, the image where the object is displayed may be a main image or an image for which a manipulation most recently or other identification information is performed.

In addition, the display 120 may display number information corresponding to each of a plurality of images.

The controller 130 controls overall operations of the display apparatus 100. Specifically, if a multi-view display command is input through the input unit 110, the controller 130 controls the display 120 to display a plurality of content images.

In this state, if a manipulation regarding the display apparatus 100 is input, the controller 130 may control the display 120 to display an object for receiving an input regarding which image is subject to the user manipulation. More specifically, if a manipulation regarding the display apparatus is sensed, the controller 130 may control the display 120 to display an object indicating one or a single image where the manipulation command is to be applied from among a plurality of images, and receive an input of the image where the manipulation command is to be applied based on a user command to move the object (or control display location).

In addition, the controller 130 may control the display 120 to display number information on each of a plurality of images, and may receive an image for which a manipulation command is to be applied according to an input number key corresponding to the displayed number information.

Subsequently, if a manipulation command is input through the input unit 110, the controller 130 may control the display 120 to display a new image corresponding to the input manipulation command on the image where the object is located from among a plurality of images.

As such, if a user manipulation is sensed while the display apparatus 100 performs a multi-view display, the display apparatus 100 according to an exemplary embodiment may easily inform a user of the image where the user manipulation is to be applied and allow the user to change the image where the manipulation is to be applied. Therefore, the user may easily control each of the multi-view images.

In the above exemplary embodiment, the configuration of the display apparatus 100 has been briefly described, but the display apparatus 100 may include further a configuration. A more detailed configuration of the display apparatus will be described with reference to FIG. i3.

Figure 3:
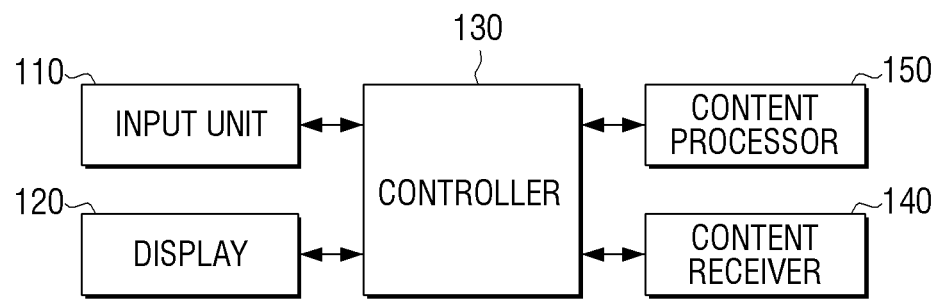
FIG. 3 is a block diagram illustrating configuration of the display apparatus of FIG. 1 in detail.

FIG. 3 is a block diagram illustrating a configuration of the display apparatus of FIG. 1 in detail.

Referring to FIG. 3, the display apparatus 100 according to an exemplary embodiment may include the input unit 110, the display 120, the controller 130, a content receiver 140, and a content processor 150.

For the operations of the input unit 110, the display 120, and the controller 130 are overlapped with those in FIG. 2, and further description will not be provided.

The content receiver 140 is connected to a plurality of input sources providing contents, and receives a content from at least one of the plurality of input sources according to an operation mode of the display apparatus 100. The plurality of input sources may include TV1, TV2, HDMI1, HDMI2, USB, Internet, etc., but are not limited thereto. The plurality of input sources may further include other input sources.

If the display apparatus 100 operates in a general mode, the content receiver 140 may receive a content from one source which is pre-selected by a user. On the other hand, if the display apparatus 100 operates in a multi-view mode, the content receiver 140 may receive a content from more than two input sources which are selected by a user.

The content processor 150 processes a content received through the content receiver 140.

Specifically, if the display apparatus 100 operates in a general mode, the content receiver 140 may receive one or a single content from one or a single input source. Accordingly, the content processor 150 processes in one content and provides the content to the display 120.

Alternatively, if the display apparatus 100 operates in a multi-view mode, the content receiver 140 may receive two or more contents from at least two input sources. Accordingly, the content processor 150 processes the plurality of contents, generates a plurality of content views, and provides the same to the display 120. The method of generating the plurality of content views will be described in detail with reference to FIGS. 4 and 9.

FIGS. 4 to 8 are views illustrating an example screen which may be displayed in a first multi-view mode.

Figure 4:
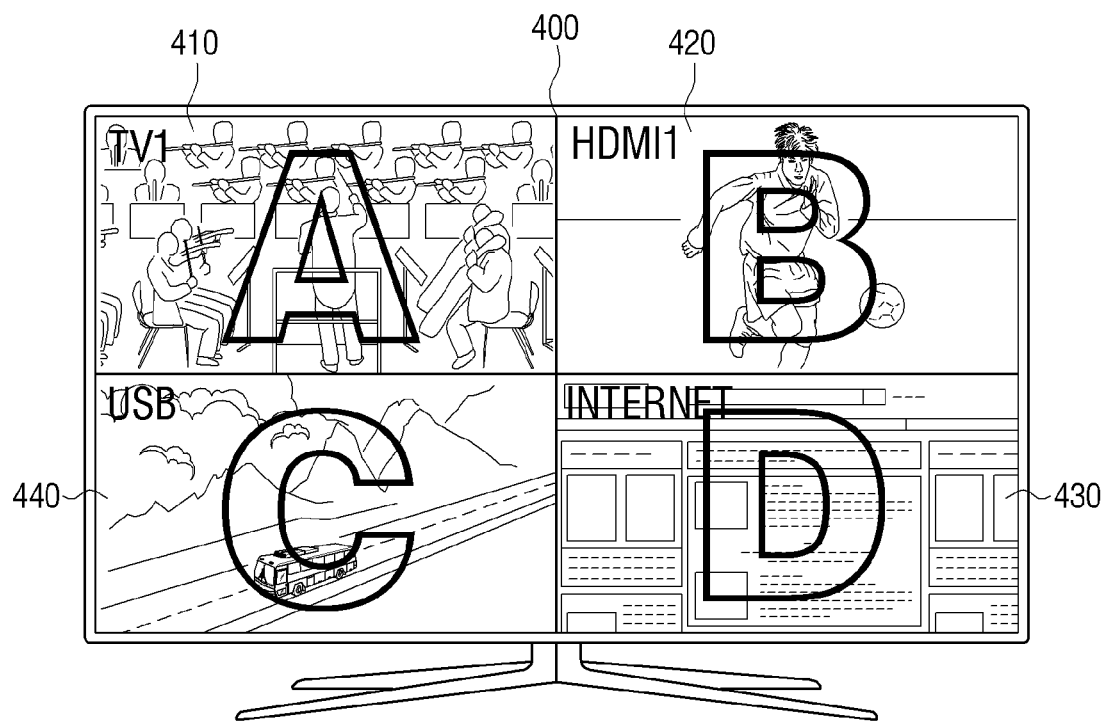
FIGS. 4 to 8 are views illustrating an example screen which may be displayed in a first multi-view mode.

Specifically, FIG. 4 is a view illustrating an example screen where four split screens are displayed adjacently in the first multi-view mode.

Herein, in the first multi-view mode, a plurality of contents are displayed on each of a plurality of split screens one of one or a single screen, and a screen 400 includes four split screens 410, 420, 430, 440. Meanwhile, in the exemplary embodiment, a single screen includes four split screens, but the single screen may include only two split screens, or more than four split screens, TV1.

The first split screen 410 displays a first content image input from a television source. In this case, the first split screen 410 is presumed to be a main screen. This screen 410 is identified by the letter "A".

The second split screen 420 displays a second content image input from a HDMI source, HDMI 1.

The third split screen 430 displays a third content image input from Internet.

The fourth split screen 440 displays a fourth content image stored in an external storage element, use or in an internal storage element.

In this state, if a general mode conversion command is input through the input unit 110, the content displayed on the first split screen 410 which is the main image is displayed in a full screen.

Figure 5:
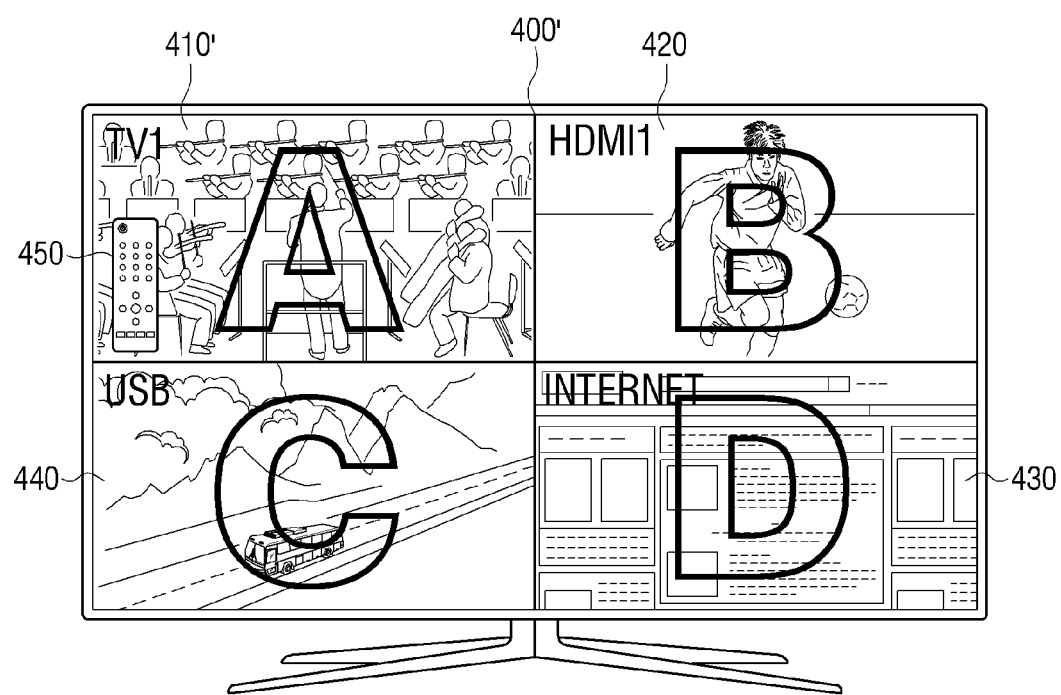

Meanwhile, if a manipulation or a screen touch regarding an image other than a general mode conversion, etc. is input while the screen of FIG. 4 is displayed, the display 120 may display the screen of FIG. 5.

In FIG. 4, four split screens are displayed in an equal size, but each split screen may have a different size. In addition, one screen may be divided into four split screens using a method which is different from the method of FIG. 4.

FIG. 5 is a view illustrating an example screen which may be displayed when a manipulation regarding a display apparatus is sensed while the display apparatus operates in the first multi-view mode.

Referring to FIG. 5, an object 450, in this case an image of a remote controlled, is displayed on one side of a first split screen 410' from among the plurality of split screens. Meanwhile, in the exemplary embodiment, a shape of a remote controller 450 is displayed, but an indicator object appropriate for the characteristics each of the split screens may be displayed. For example, if the corresponding image is an image displaying television channels, a channel keypad including a UI for receiving a channel up/down command may be displayed, or a number keypad for directly receiving a channel number may be displayed. Alternatively, if the corresponding image is an image displaying a content received from an external apparatus through HDMI or USB, a keypad including a UI screen for receiving a command, such as a command to play/pause of the corresponding content, may be displayed. If the corresponding image is an image displaying a content received through Internet, a qwerty keypad including a UI for receiving a character may be displayed.

If the image that a user wishes to manipulate is the first split screen 410', the user may recognize that the manipulation command to be input will be applied to the first split screen since the shape of the remote controller 450 is displayed on the first split screen 410'.

Accordingly, if the user inputs a manipulation command, a new image corresponding to the manipulation command is applied and displayed on the first split screen 410'. For example, if a number keypad is displayed on the first split screen 410, and a user presses '7' on the number keypad, the broadcast content of channel 7 may be displayed on the first split screen 410'. In this case, the second to the fourth split screens may continue to display the content which has been previously displayed, that is, they do not change.

Meanwhile, if the image that a user wishes to manipulate is not the first split screen 410', the user may input a command to move a displayed indicator object. For example, the user may move the object using a command to move a cursor left/right/up/down, or may move the object by touching and dragging the displayed object. If it is possible to control the object using a remote controller which may point on the screen of the display apparatus (specifically, a remote controller with a gyro sensor or an accelerator sensor), the user may move the object in accordance with a pointing location of the remote controller on the screen of the display apparatus. For example, a command to move the object may be input by disposing a pointer on the object in the shape of remote controller displayed in FIG. 5, clicking a confirm button for a predetermined time, and moving to another split screen without releasing the button, that is a drag and drop type operation.

Figure 6:
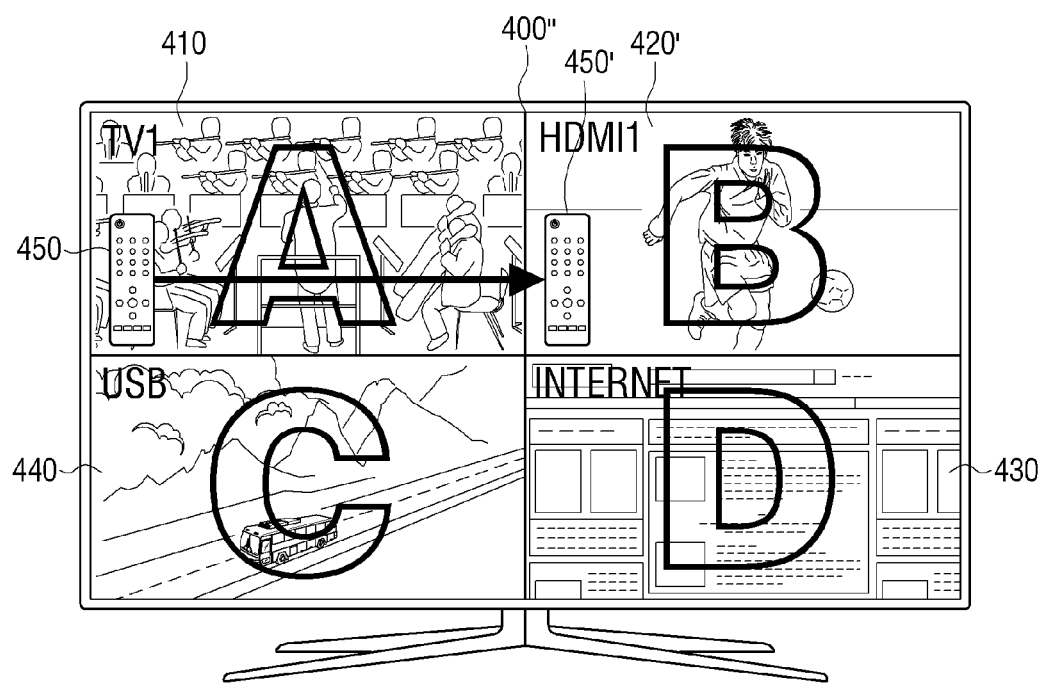

Through the above-described move operation, the indicator object may be moved to the second split screen 420, and the display apparatus 100 may display the screen of FIG. 6.

Meanwhile, in the exemplary embodiment, an object is displayed on the first split screen 410' by sensing a user manipulation, but the indicator object may be displayed in another split screen. For example, if a user image which is recently manipulated is the fourth split screen, the object may be located and displayed on the fourth split screen 440 by sensing the user manipulation.

Meanwhile, in the above exemplary embodiment, a fixed object (a remote controller in this example) is displayed corresponding to a screen where the object is displayed. However, a user may control the display apparatus using a remote controller which may point to the screen of the display apparatus, and the user may change the shape of object by disposing the pointer on the object displayed on the first split screen 410' and pressing a confirm button on the remote controller. For example, the user may change the object displayed in FIG. 5 which is the shape of a remote controller to other objects (for example, qwerty keypad) in a predetermined order by sequentially pressing a confirm button while disposing the pointer on the corresponding object.

FIG. 6 is a view illustrating an example screen which may be displayed when a manipulation regarding a display apparatus is sensed while the display apparatus operates in the first multi-view mode.

Referring to FIG. 6, an object 450 is displayed on one side of the second slit screen 420' from among a plurality of split screens. Meanwhile, in the exemplary embodiment, the shape of remote controller is displayed for object 450, but an object appropriate for the characteristics of split images may be displayed. For example, the second split screen 420' displays a content received from an external apparatus through HDMI, an object including a UI for receiving a command, such as a command to play/pause the corresponding content, may be displayed.

Meanwhile, if the image that a user wishes to manipulate is the second split screen 420', the user may recognize that a manipulation command to be input will be applied to the second split screen as the shape of remote controller is displayed on the second split screen 420'.

Accordingly, if the user inputs a manipulation command, a new image corresponding to the manipulation command may be applied and displayed on the second split screen 420.

For example, if an indicator object for receiving a play/pause command is displayed on the second split screen 420 and a user presses a pause key, the existing content on the second split screen 420 may be paused.

Meanwhile, if the image that a user wishes to manipulate is not the second split screen 420, the user may input a command to move a displayed indicator object. For example, the user may move the object by using a command to move the cursor left/right/up/down or by touching and dragging the displayed object.

Figure 7:
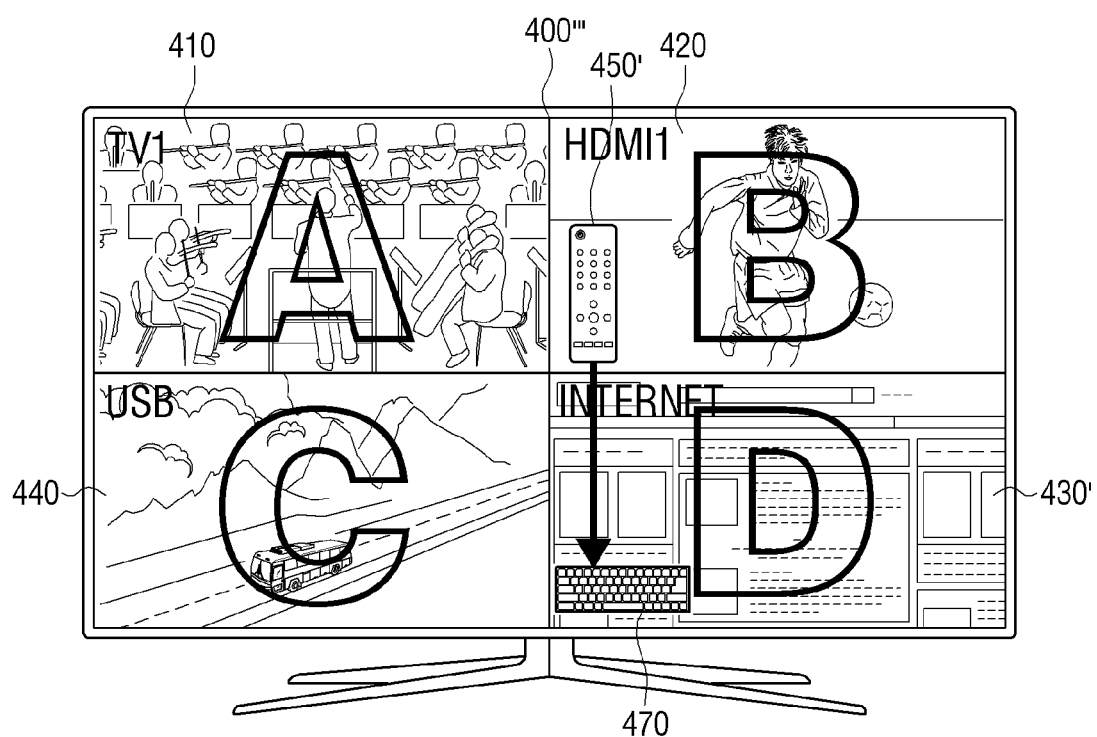

Through the above-described move operation, the indicator object may move to the third split screen 430, and the display apparatus 100 may display the screen of FIG. 7.

FIG. 7 is a view illustrating an example screen which may be displayed when a manipulation regarding a display apparatus is sensed while the display apparatus operates in the first multi-view mode.

Referring to FIG. 7, a qwerty object 470 is displayed on one side of the third split screen 430' from among a plurality of split screens.

Meanwhile, if the image that a user wishes to manipulate is the third split screen 430', the user may recognize that a manipulation command to be input will be applied to the third split screen as a qwerty keypad 470 is displayed on the third split screen 430'.

Accordingly, if the user inputs a manipulation command, a new image corresponding to the manipulation command may be applied and displayed on the third split screen 430'.

Meanwhile, if the image that a user wishes to manipulate is not the third split screen 430, the user may input a command to move the displayed object. For example, the user may move the object by using a command to move the cursor left/right/up/down or by touching and dragging the displayed object.

Meanwhile, in FIGS. 5 to 7, the object is located at the lower left of the split screens, but the object may be displayed in other locations (for example, the front of the split screens), or the location where the object is displayed may vary depending on each split screen. In this case, the display location may vary according to the characteristics of the content which is being displayed on the split screens.

In the above exemplary embodiment, a plurality of split screens have the same size, but the split screen where an object is disposed may be displayed in a larger size that the other split screens.

In the above exemplary embodiment, first of all, an object is displayed, and by moving the location of the object, an image where a manipulation is to be applied is selected. However, a number corresponding to the screen where a manipulation is to be applied may be received in order to select the image where the manipulation is to be executed, which will be described below with reference to FIG. 8.

Figure 8:
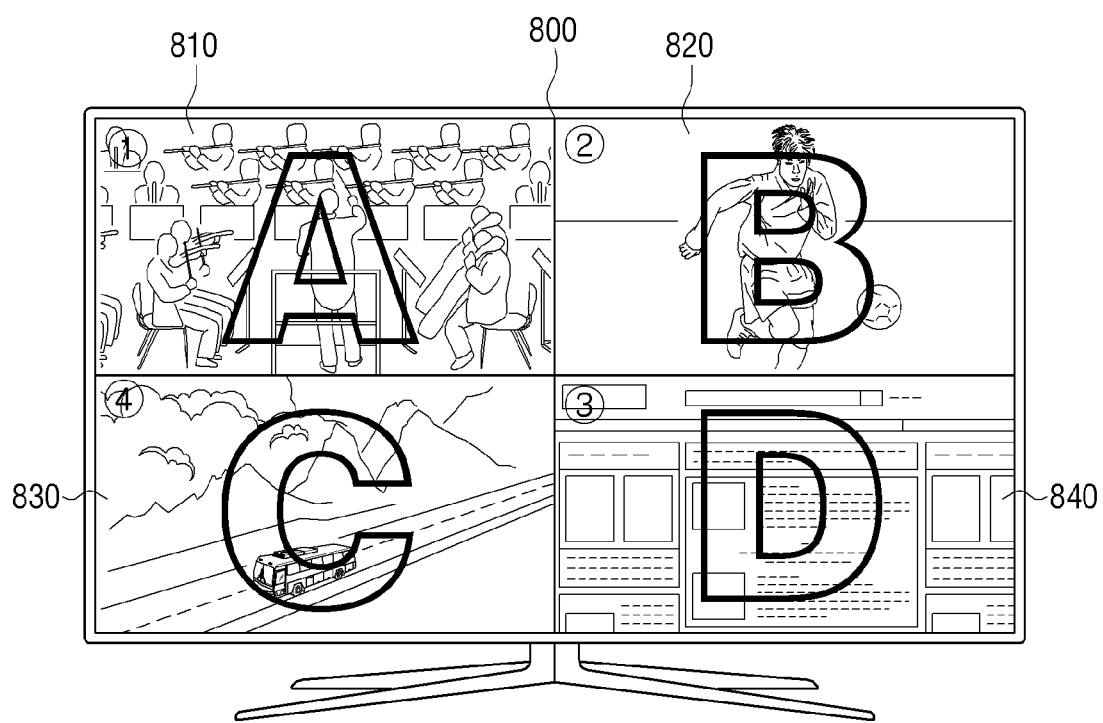

FIG. 8 is a view illustrating another example screen which may be displayed when a manipulation regarding a display apparatus is sensed while the display apparatus operates in the first multi-view mode.

Referring to FIG. 8, each of a plurality of split screens 810, 820, 830, 840 displays number information corresponding to the split screens. For example, the first split screen 810 displays the number '1', the second split screen 820 displays the number '2', the third split screen 830 displays the number '4', and the fourth split screen 840 displays the number '3'.

As the number information is displayed as mentioned above, a user may select an image where a manipulation is to be executed using the number keys. For example, if the user wishes to manipulate the fourth split screen 840, the user may select '3' displayed on the fourth split screen 840, that is, enter a "3". In this case, the display apparatus 100 may display the screen of FIG. 7.

Meanwhile, in the above exemplary embodiment, the method of moving the object and the method of inputting a number key are performed distinctively, but the two methods may be used in a mixed manner. For example, if a mode is changed from a general mode to a multi-view mode for the first time, an image to be controlled may be selected preferentially through the screen of FIG. 8. If there is a history of performing a manipulation in a multi-view mode, an image may be selected by moving an object. In this case, the image where the object is displayed may be an image corresponding to a recently-performed manipulation. For example, the number key of '3' may be received for the screen of FIG. 8, and then the screen of FIG. 7 may be displayed. Subsequently, a manipulation regarding the third split screen may be performed first on the screen of FIG. 7. After the first manipulation is completed, the screen is returned to the screen of FIG. 4. Afterwards, when a manipulation regarding a display apparatus is sensed, the screen where a control right regarding the third split screen is displayed may be displayed as shown in FIG. 7.

FIGS. 9 to 12 are views illustrating an example screen which may be displayed in a second multi-view mode.

Specifically, FIG. 9 is a view illustrating an example screen which may be displayed in the second multi-view mode displaying two images.

Referring to FIG. 9, a screen 900 displays the first image (content) and the second image (content) alternately. Specifically, when image signals corresponding to the first content and the second content are received, the display apparatus 100 performs various image processing with respect to each signal, such as decoding, deinterleaving, scaling, frame rate conversions, etc., and generates image frames. Subsequently, the display apparatus 100 arranges the two image frames in a crossed manner.

Specifically, in the second multi-view mode, the display apparatus 100 displays image frame of the first content and the image frame of the second content alternately by at least one frame unit.

In addition, the display apparatus 100 may generate a sync signal to synchronize the display timing of the first content image frame and the display timing of the second content image frame with the operations of each several 3D glasses apparatuses 30-1, 30-2, and transmit the sync signal to each of the glasses apparatuses 30-1, 30-2.

The sync signal may be generated in various forms according to a wireless communication method which is applied between the display apparatus 100 and the glasses apparatuses 30-1, 30-2. For example, the sync signal may be generated in a form of RF signal or IF signal, or may be generated in the form of data packet according to Bluetooth, WiFi, ZigBee, IEEE, and other various wireless communication standards.

In addition, the display apparatus 100 may transmit an audio signal of the first content and the audio signal of the second content to the glasses apparatuses 30-1, 30-2. Accordingly, users may watch the first content and the second content through each of the glasses apparatuses 30-1, 30-2.

In FIG. 6, two glasses apparatuses 30-1, 30-2 are illustrated, but the number of glasses apparatuses are not limited thereto. In other words, more than two glasses apparatuses may be used, and the number of combined contents may increase accordingly.

Figure 10:
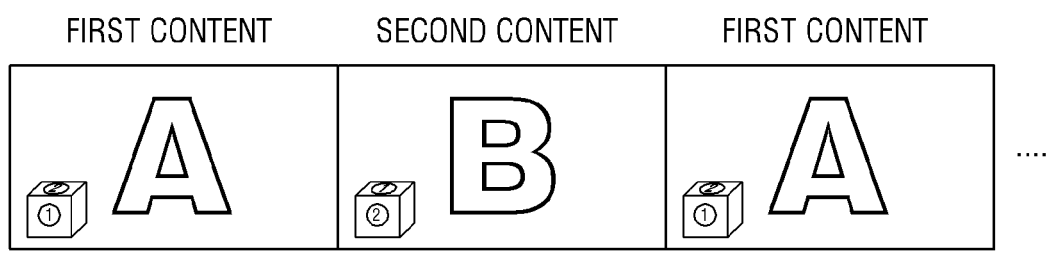

If the display apparatus 100 is manipulated while the screen 900 is displayed, for example, if a specific button is pressed on a remote controller and a touch on the screen is input, the screen of FIG. 10 may be displayed.

FIG. 10 is a view illustrating an example screen which may be displayed when a manipulation regarding a display apparatus is sensed in the second multi-view mode.

Referring to FIG. 10, each of a plurality of images displays corresponding number information. For example, the first image displays '1', surrounded by a circle, as a main number in a number block or cube, and the second image displays '2'. Meanwhile, in FIG. 10, two numbers are displayed in a stereoscopic form, but only the numbers corresponding to images may be displayed.

When such number information is displayed, a user may input a number key corresponding to an image to be controlled. For example, if the user selects the number key '1' on the number keypad, the screen of FIG. 11 can be displayed. On the other hand, if the user selects the number key of '2' on the number keypad, the screen of FIG. 12 can be displayed.

Meanwhile, in the above description, an image to be controlled is selected by inputting a number key, but an image to be controlled can be selected through an operation of rotating the displayed number block. For example, if the second user watching the second content is manipulating the display apparatus, the second user may rotate the displayed number block to display the number '1' and input a control command regarding the second content.

Figure 11:
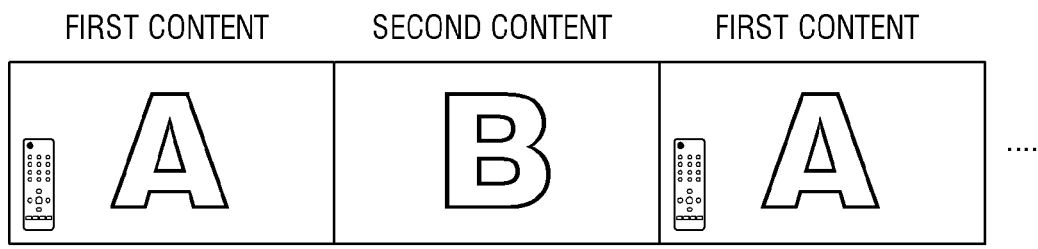

FIG. 11 is a view illustrating an example screen where an image corresponding to the first content is selected.

Referring to FIG. 11, an object (a remote controller) is displayed on the image corresponding to the first content from among a plurality of screens. The first content is a screen where a TV is displayed and thus, displays a number keypad in the shape of remote controller for receiving an input of a TV channel change command.

Meanwhile, no object is displayed on the image corresponding to the second content. Accordingly, the second user may watch the second content without any visual interference while the first user performs manipulation on or of the first content.

Figure 12:
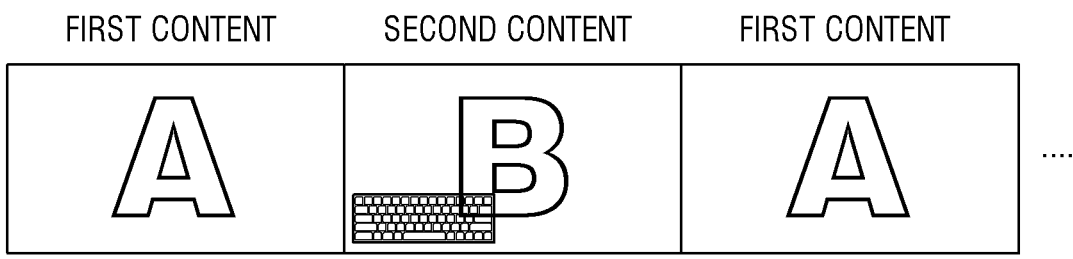

FIG. 12 is a view illustrating an example screen where an image corresponding to the second content is selected.

Referring to FIG. 12, an object is displayed on the image corresponding to the second content from among a plurality of contents. The second content displays an Internet image and thus, displays a qwerty keypad object for receiving an Internet search word.

In this case, no object involving a manipulation is displayed on the image corresponding to the first content. Accordingly, the first user may watch the first content without any visual interference while the second user performs a manipulation on the second content.

Figure 13:
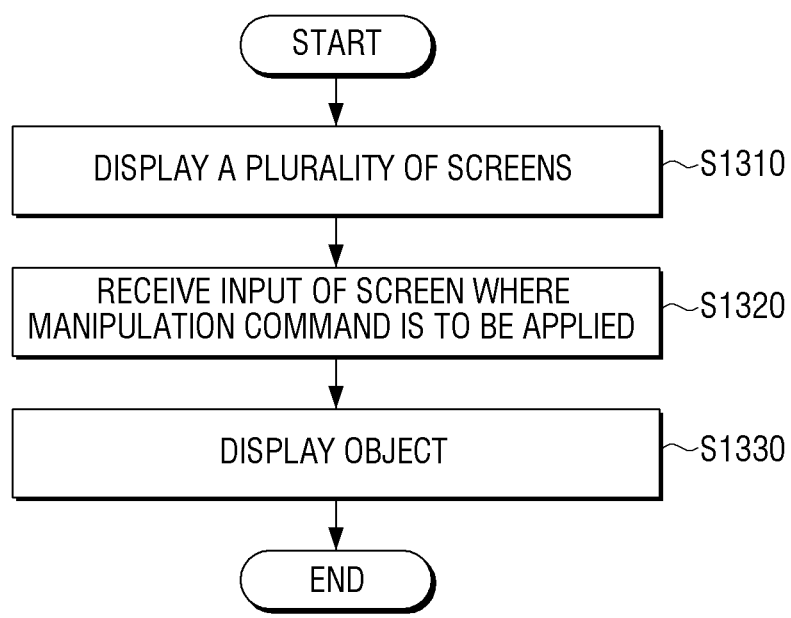
FIG. 13 is a flowchart provided to explain a method for performing multi-view display according to an exemplary embodiment.

FIG. 13 is a flowchart provided to explain a method of performing multi-view display according to an exemplary embodiment.

Referring to FIG. 13, first of all, a plurality of images corresponding to the plurality of contents are displayed (S1310). Specifically, the plurality of images corresponding to each of the plurality of contents may be displayed on each of a plurality of split screens regarding of a single screen simultaneously, or the plurality of images corresponding to the plurality of contents may be displayed alternately.

Subsequently, an image where a manipulation command is to be applied is input from among the plurality of images (S1320). Specifically, if a manipulation regarding the display apparatus is sensed in the first multi-view mode, an object is displayed on one of the plurality of split screens, and an image where the manipulation command is to be applied may be input by receiving an input of a command to move the displayed object to anther split screen.

An object, for receiving a manipulation command regarding an image, is displayed on the image where the manipulation command is to be applied (S1330). Specifically, if a command to move the object is input, an object may be displayed on the image for which the command is input. In this case, the displayed object may be an object corresponding to the current image. For example, if the input source of the current image is TV, a channel keypad or a number keypad for receiving a TV channel may be displayed. Alternatively, if the input source of the current image is Internet, a qwerty keypad for receiving an input of a search word may be displayed.

If a manipulation command is input through the displayed object as described above, a new image corresponding to the input manipulation command may be displayed on the image where the object is located.

As such, according to the above method of performing multi-view display, if a user manipulation is sensed in a multi-view display, an image where the user manipulation is to be applied is notified to the user to allow the user to easily change the image where the manipulation is to be applied. Accordingly, the user may easily control each of multi-view screens. The method of performing a multi-view display as illustrated in FIG. 13 may be performed in a display apparatus having the configuration of FIG. 2 of FIG. 3, but the method may be performed in a display apparatus having other configurations.

The above-described method of performing multi-view display may be realized as at least one execution program to perform a multi-view display as described above, and the execution program may be stored in a non-transitory computer readable medium or storage.

The non-transitory computer readable medium refers to a medium which may store data semi-permanently rather than storing data for a short time such as a register, a cache, and a memory and may be readable by an apparatus. Specifically, the non-transitory recordable medium may be CD, DVD, hard disk, Blu-ray disk, USB, memory card, ROM, etc.

The foregoing embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A display apparatus controlled by a remote controller comprising 4 direction keys and channel up/down keys, comprising:
   a display;
   an input receiver configured to receive a user input through the remote controller;
   a processor configured to control the display to display a plurality of images in a plurality of screens respectively, the plurality of images corresponding to a plurality of contents respectively, to control the display to display a first control image in a first screen among the plurality of screens to indicate that the first screen among the plurality of screens is to be controlled by a user input received via the remote controller, in response to a user input through the remote controller being received while the first control image is displayed in the first screen, to control a source of content corresponding to the first screen according to the user input with respect to the first screen, in response to one of the 4 direction keys being manipulated while the first control image is displayed in the first screen, to display a second control image in a second screen among the plurality of screens, and in response to a user input through the remote controller being received while the second control image is displayed in the second screen, to control a source of content corresponding to the second screen according to the user input with respect to the second screen, wherein the first and second control images to be displayed are selected among a plurality of control images representing a plurality of types of remote controller according to a source of a content displayed in a screen in which the control image is to be displayed.

2. The apparatus as claimed in claim 1, wherein the control image has one of a number keypad shape, a qwerty keypad shape, a channel keypad shape, and a remote controller shape.

3. The apparatus as claimed in claim 1, wherein the second screen is disposed in a position corresponding to a direction of the manipulated key, with respect to the first screen.

4. The apparatus as claimed in claim 1, further comprising:
　a content receiver configured to receive content from each of a plurality of input sources corresponding to the plurality of screens; and
　wherein the processor configured to generate a multi-view screen where a plurality of images corresponding to the received plurality of contents are simultaneously displayed on correspondingly each of a plurality of split screens of a single screen and provide the multi-view screen to the display.

5. The apparatus as claimed in claim 4, wherein the input sources are one of television, HDMI (high-definition multimedia interference), USB (universal serial bus), and Internet.

6. A method of performing a multi-view display of a display apparatus controlled by a remote controller comprising 4 direction keys and channel up/down keys, comprising:

displaying a plurality of images in a plurality of screens respectively, the plurality of images corresponding to a plurality of contents;

displaying, a first control image in a first screen among the plurality of screens to indicate that the first screen among the plurality of screens to be controlled by a user input received via the remote controller, in response to a user input through the remote controller being received while the first control image is displayed in the first screen, controlling a source of content corresponding to the first screen according to the user input with respect to the first screen in response to a one of the 4 direction keys being manipulated while the first control image is displayed in the first screen, displaying the second control image in a second screen among the plurality of screens, and in response to a user input through the remote controller being received while the second control image is displayed in the second screen, controlling a source of content corresponding to the second screen according to the user input with respect to the second screen, wherein the first and the second control images to be displayed are selected among a plurality of control images representing a plurality of types of remote controller according to a source of a content displayed in a screen in which the control image is to be displayed.

7. The method as claimed in claim 6, wherein the control image has one of a number keypad shape, a qwerty keypad shape, a channel keypad shape, and a remote controller shape.

8. The method as claimed in claim 6, wherein the second screen is disposed in a position corresponding to a direction of the manipulated key, with resect to the first screen.

9. The method as claimed in claim 6, further comprising:
　receiving a content from each of a plurality of input sources corresponding to the plurality of screens; and
　generating a multi-view screen where a plurality of images corresponding to the received plurality of contents are simultaneously displayed on each of a plurality of split screens of a single screen,
　wherein the displaying comprises displaying the generated multi-view screen.

10. The method as claimed in claim 9, wherein the input sources are one of television, HDMI (high-definition multimedia interference), USB (universal serial bus), and Internet.

* * * * *

UNITED STATES PATENT AND TRADEMARK OFFICE
CERTIFICATE OF CORRECTION

PATENT NO.         : 9,928,020 B2
APPLICATION NO.    : 14/629993
DATED              : March 27, 2018
INVENTOR(S)        : Sung-chang Jang It is certified that error appears in the above-identified patent and that said Letters Patent is hereby corrected as shown below:

Column 16, Line 34, In Claim 8, delete "resect" and insert -- respect --, therefore.

Signed and Sealed this
Twenty-ninth Day of May, 2018

Andrei Iancu
*Director of the United States Patent and Trademark Office*